(12) United States Patent
CaraDonna et al.

(10) Patent No.: US 10,228,964 B2
(45) Date of Patent: Mar. 12, 2019

(54) STORAGE LAYER BASED ORCHESTRATION METHOD FOR VIRTUAL MACHINE MIGRATION ACROSS DISPARATE VIRTUALIZATION ENVIRONMENTS

(71) Applicant: NetApp, Inc., Sunnyvale, CA (US)

(72) Inventors: Joseph P. CaraDonna, Ashland, MA (US); Sungwook Ryu, Palo Alto, CA (US)

(73) Assignee: NETAPP, INC., Sunnyvale, CA (US)

(*) Notice: Subject to any disclaimer, the term of this patent is extended or adjusted under 35 U.S.C. 154(b) by 8 days.

(21) Appl. No.: 15/387,416

(22) Filed: Dec. 21, 2016

(65) Prior Publication Data

US 2018/0173554 A1    Jun. 21, 2018

(51) Int. Cl.
*G06F 9/455*    (2018.01)
*G06F 11/07*    (2006.01)

(52) U.S. Cl.
CPC .......... *G06F 9/45558* (2013.01); *G06F 11/07* (2013.01); *G06F 2009/4557* (2013.01); *G06F 2009/45575* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,046,550 | B2* | 10/2011 | Feathergill | G06F 11/1466 711/162 |
| 2011/0265076 | A1* | 10/2011 | Thorat | G06F 8/65 717/172 |
| 2014/0298317 | A1* | 10/2014 | Devine | G06F 8/61 717/174 |
| 2015/0121122 | A1* | 4/2015 | Towstopiat | G06F 11/1471 714/4.11 |

(Continued)

OTHER PUBLICATIONS

Robinson, et al., "Using Amazon Web Services for Disaster Recovery", Amazon Web Services, Oct. 2014, 22 pages, retrieved on Nov. 3, 2016 from https://media.amazonwebservices.com/AWS_Disaster_Recovery.pdf.

(Continued)

*Primary Examiner* — Gregory A Kessler
(74) *Attorney, Agent, or Firm* — Haynes and Boone, LLP (57) ABSTRACT

A storage layer based orchestration method can efficiently migrate a virtualized, enterprise scale system across disparate virtualization environments. A copy of a source logical storage container with multiple virtual disks of virtual machines (VMs) can be created in a public cloud destination as a destination logical storage container. Each of the VMs is associated with at least one virtual disk that includes boot data ("boot disk") for the VM. With application programming interface function calls and/or scripted task automation and configuration management commands, the orchestration method coordinates different applications and tools to convert the boot disks into canonical storage representations (Continued)

(e.g., logical unit numbers (LUNs)), to instantiate VMs in the destination environment, and to chain load the boot disks to launch the VMs in a different virtualization environment.

4 Claims, 6 Drawing Sheets

(56) References Cited

U.S. PATENT DOCUMENTS

2015/0324217 A1* 11/2015 Shilmover .......... G06F 9/45558
                                                                  718/1
2016/0132400 A1    5/2016 Pawar et al.

OTHER PUBLICATIONS

Whitehouse, et al., "Amazon Web Services: Enabling Cost-Efficient Disaster Recovery Leveraging Cloud Infrastructure", Enterprise Strategy Group, White Paper, Jan. 2012, 16 pages, retrieved on Nov. 3, 2016 from http://d36cz9buwru1tt.cloudfront.net/ESG_WP_AWS_DR_Jan_2012.pdf.
International Search Report and Written Opinion for Application No. PCT/US2017/067606 dated Apr. 4, 2018, 11 pages.

* cited by examiner

STORAGE LAYER BASED ORCHESTRATION METHOD FOR VIRTUAL MACHINE MIGRATION ACROSS DISPARATE VIRTUALIZATION ENVIRONMENTS

BACKGROUND

The disclosure generally relates to the field of data processing, and more particularly to multicomputer data transferring.

Although many businesses acknowledge the value of a disaster recovery plan for business continuity, the cost of a disaster recovery site can be prohibitive. And the resources would be spent on a site that is often unused. With the public cloud, businesses can create a disaster recovery plan that uses resources of a cloud service provider. This is commonly referred to as cloud-based disaster recovery. Businesses can leverage the elasticity of the cloud for an on-demand cloud-based disaster recovery service and pay for actual use of the cloud service provider resources instead of idle/unused resources.

Cloud-based disaster recovery solutions may be offered directly by a cloud service provider, or be delivered as a layered service by the end-user or third party. There are different types of disaster recovery: 1) backup and restore, 2) pilot light, and 3) warm standby. Backup and restore disaster recovery typically involves backing up data to persistent storage and then restoring that backup data to a site, perhaps the primary site after the disaster has ended. This type of disaster recovery has the slowest restore time. Pilot light disaster recovery relies on a minimal version of the primary environment running in the cloud. When recovery is needed, additional resources are provisioned and/or started to bring the minimal version up to a full-scale production environment. Warm standby disaster recovery maintains a scaled-down version of a primary environment in the public cloud. The scaled-down environment for a warm standby disaster recovery can entail multiple servers and services running in the public cloud that would not be running in a pilot light disaster recovery solution.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to illustrative examples in a disaster recovery context, but embodiments are not limited to that context. Embodiments can switch between virtualized environments at the storage layer in other contexts, such as trial or test runs of a partial production environment with different cloud service providers. In other instances, well-known instruction instances, protocols, structures and techniques have not been shown in detail in order not to obfuscate the description.

Overview

Cloud-based disaster recovery ("cloud DR") for many businesses includes continuity of applications, as well as the underlying data. When cloud DR includes continuity of applications, the applications are run on virtual machines in the public cloud. In many cases, a primary data center for a business will use a virtualization environment that is different than the virtualization environment used by a service provider. Host-based cloud DR solutions copy virtual disk state (boot and data drives) on a host by host basis—replicating the virtual drives of each host to the cloud storage, or importing them into cloud images (e.g., AWS® Amazon® Machine Image (AMI)). Doing this often loses the storage efficiency provided by the storage layer (e.g., deduplication, compression, thin provisioning), and increases network bandwidth requirements to handle the rehydrated data. In addition, it complicates failback operations, since recovery involves booting each host with a special recovery image to setup replication and resynchronize changed state. This process is labor intensive, error prone, and impractical on an enterprise scale.

In contrast to host-based cloud DR solutions, orchestrating the manipulation and activation of virtual machine data at a storage layer for cloud DR (a "storage layer cloud DR approach") can efficiently launch a virtualized, enterprise scale system in a foreign virtualization environment from a storage layer. Data underlying the virtualized system is copied at the storage layer from a source site into a destination site that hosts the foreign virtualization environment (foreign from the perspective of the virtualization environment in the source site). The application leverages the underlying data of the virtualized system that has been replicated at the storage layer. This avoids the inefficiencies of migrating or exporting virtual machines at the guest operating system layer and allows enterprise scale shifting of VMs at a primary site (e.g., thousands of VMs) to a cloud site despite differences in virtualization technology. This approach also preserves storage efficiencies, minimizes network traffic, and simplifies common DR operations, such as: DR drills, failover, and failback. Failover and failback operations performed at a storage layer instead of the guest operating system layer can be done efficiently on an enterprise scale, but can be impeded by incompatibilities between virtualization environments, where hypervisors, virtual disk formats, and orchestration methods vary. For example, a virtual machine instantiated in a VMware® data center environment cannot be natively booted in an Amazon or Microsoft® public cloud. An application To avoid the complications of interoperability between different VM environments, this orchestrating storage layer cloud DR approach converts virtual disks of a primary site virtualization environment into widely adopted storage representations, such as logical unit numbers (LUNs). A copy of a source logical storage container with multiple virtual disks of VMs can be created in a public cloud destination as a destination logical storage container. Each of the VMs is associated with at least one virtual disk that includes boot data ("boot disk") for the VM. With application programming interface function calls and/or scripted task automation and configuration management commands, different applications and tools are coordinated to convert the boot disks into widely adopted storage representations, to instantiate VMs in the destination environment, and to chain load the boot disks to spin up the virtualized, enterprise scale system in the destination environment. This approach can be implemented as an application (e.g., data center management application), a script, software as a service, and various combinations thereof.

Example Illustrations

Figure 1:
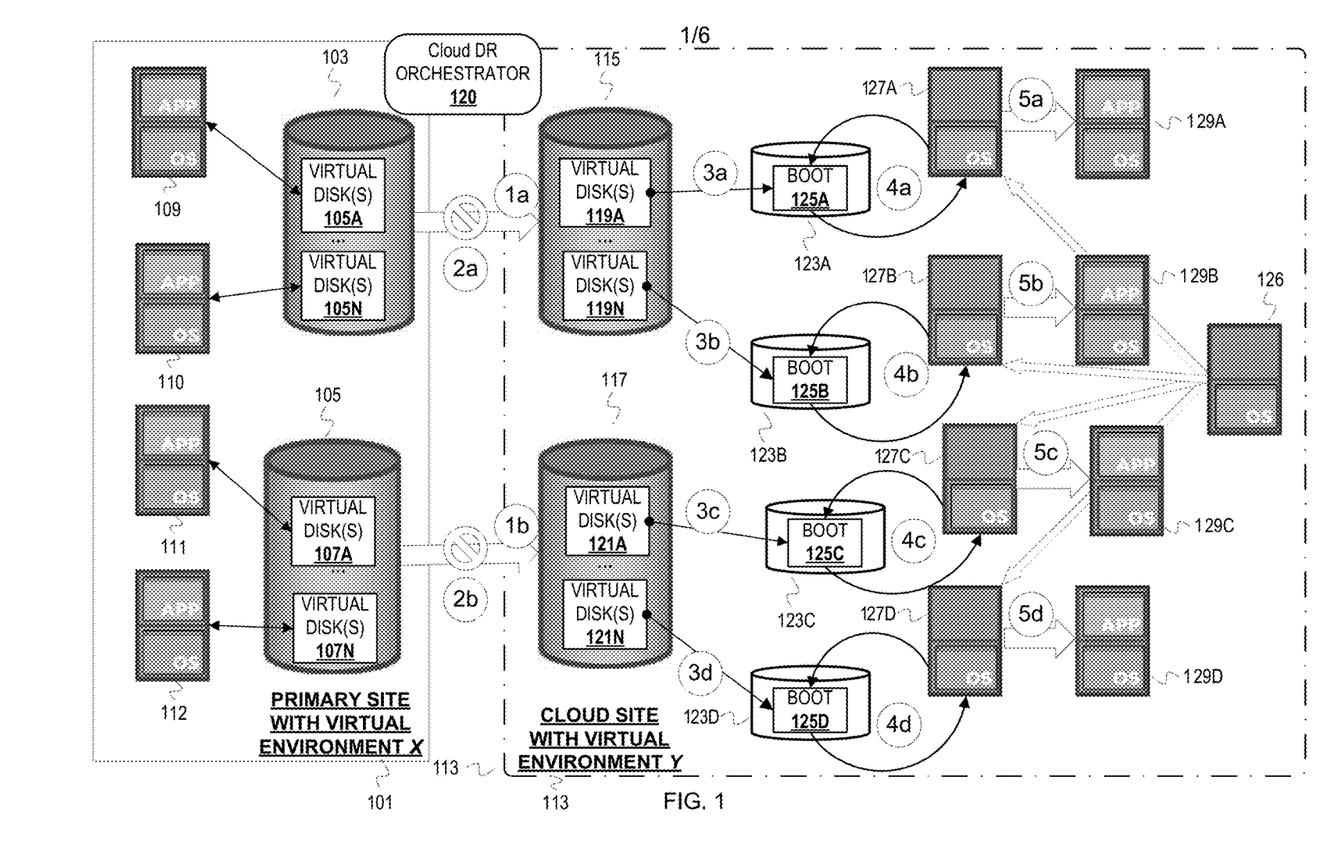
FIG. 1 is a conceptual diagram of launching a virtualized system from a source environment to a foreign virtualization environment hosted in a public cloud.

FIG. 1 is a conceptual diagram of launching a virtualized system from a source environment into a foreign virtualization environment hosted in a public cloud. FIG. 1 refers to virtual environments X and Y to generically identify different virtualization environments without limiting the example illustration to a particular vendor and to acknowledge limited visibility into the environments of some public cloud service providers. In FIG. 1, a virtualized system in a primary site 101 that implements the virtual environment X is launched in a cloud site 113 that implements the virtual environment Y. The primary site 101 (e.g., a primary data center) hosts a virtualized system with multiple virtual stacks in the virtual environment X. A "virtual stack" refers to a virtual machine instance with a guest operating system and at least one application. To avoid overcomplicating the illustration, virtual machine monitors are not depicted. A primary site may have thousands of virtual stacks instantiated. FIG. 1 depicts virtual stacks 109-112.

Logical storage containers 103, 105 contain the data underlying the virtual stacks 109-112. The logical storage container 103 (e.g., a volume) contains virtual disks 105A-105N. Each of the virtual disks 105A-105N includes boot data for corresponding virtual stacks. The boot data can include VM configuration data, VM state data, application state data, etc. In this illustration, the virtual disk 105A includes the boot data for the virtual machine stack 109 and the virtual disk 105N includes the boot data for the virtual machine stack 110. Virtual machine stacks are not limited to a 1:1 relationship with virtual disks. A VM may be associated with other virtual disks, for example, with additional data for a virtual machine stack. The logical storage container 105 contains virtual disks 107A-107N. The virtual disk 107A includes boot data for the virtual machine stack 111 and the virtual disk 107N includes boot data for the virtual machine stack 112.

FIG. 1 is annotated with a series of numbers 1-5 that represents stages of operations for orchestrating launching of the virtualized system into the foreign VM environment. These stages are decomposed into sub-stages with letters to express the possibility of these operations occurring concurrently. Although these stages are ordered for this example, the stages illustrate one example to aid in understanding this disclosure and should not be used to limit the claims. Subject matter falling within the scope of the claims can vary with respect to the order and some of the operations.

To create the supporting data for the virtualized system in the destination virtual environment (i.e., cloud site 113) at a storage layer, data of the logical storage containers 103, 105 are replicated into the cloud site 113 at stages 1a and 1b. A replication relationship has been established between the primary site 101 and the cloud site 113. This can involve creating peer relationships between nodes of the primary site 101 and the cloud site 113. Creation of the peer relationships can include account creation, discovery of network addresses, exchanging authentication credentials, etc. Establishing the replication relationships also includes creating relationships between replication endpoints, such as source and destination storage containers. A variety of replication relationships are possible that fundamentally include copying data from source endpoints in the primary site 101 to destination endpoints in the cloud site 113, with the additional possible functionality of updating logical storage containers in the cloud site 113 with changes made to the logical storage containers at the primary site 101. For instance, replication relationships can be created with incremental snapshots to capture updates. Referring specifically to FIG. 1, a replication relationship has been created between the logical storage container 103 and a logical storage container 115 (e.g., a volume, a bucket, etc.) in the cloud site 113. A replication relationship has also been created between the logical storage container 105 and a logical storage container 117 in the cloud site 113. At stage 1a, the logical storage container 103 is replicated to the logical storage container 115. At stage 1b, the logical storage container 105 is replicated to the logical storage container 117. These replication relationships can be created directly with data management software or via a cloud DR orchestrator 120.

The cloud DR orchestrator 120 can be program code exposed at a management layer or accessed via a different data management software. The cloud DR orchestrator 120 is at least aware of the replication relationships that have been established between a primary site and a secondary site. For example, a file, database, etc., indicating the replications relationships can be accessible to the cloud DR orchestrator 120.

Based on detection of a disaster recovery trigger, the cloud DR orchestrator 120 orchestrates operations that carry out the failover from the storage layer into the foreign virtualization environment of the cloud site 113. Stages 3-5 encompass the orchestration of failover operations by the cloud DR orchestrator 120. Detection of the trigger and the trigger itself can vary across embodiments. For instance, the orchestrator 120 may be registered with other software components to receive notifications of system health alerts or failure states corresponding to nodes of the primary site 101. In some embodiments, the orchestrator 120 begins failover operations in response to detecting an administrator command or being activated through a management console. Regardless of the particular form of the trigger and detection path, the orchestrator 120 breaks the replication relationships between the logical storage containers of the primary site corresponding to the trigger and the logical storage containers of the cloud site 113. At stage 2a, the orchestrator 120 breaks the replication relationship between the logical storage container 103 and the logical storage container 115 at stage 2a. The orchestrator 120 also breaks the replication relationship between the logical storage container 105 and the logical storage container 117 at stage 2b. "Breaking" the replication relationship can include various configuration changes to cause replication management software to discontinue updating the logical storage containers 115, 117, but at least involves changing permissions or settings of the logical storage containers 115, 117 to allow them to be modified (e.g., changing write permissions to allow writing). Regardless of the specific command and/or configuration setting, orchestrator program code can include a call or calls to an application programming interface (API) function defined for breaking replication relationships by a storage operating system or by a replication management API.

Over stages 3a-3d, the orchestrator 120 converts virtual disks from the primary site 101 into LUNs the cloud site 113. A virtual machine can be associated with multiple virtual disks including a boot disk and one or more data disks. When a VM is associated with multiple virtual disks, the virtual disk used as a "boot disk" is distinguished from the other virtual disks associated with a VM. The orchestrator 120 converts each group of virtual disks for each VM of the logical container 115, starting with the boot disk in each set of virtual disks. FIG. 1 only illustrates conversion of the boot disk due to limited drawing space, but the data disks are also converted. The orchestrator 120 converts the virtual disk 119A (i.e., the boot disk of the VM 109) into a LUN 125A with boot data 125A at stage 3a. At 3b, the orchestrator 120A converts the virtual disk 119N into a LUN 123B with boot data 125B of the VM 110. At 3c, the orchestrator 120B converts the virtual disk 121A into a LUN 123C with boot data 125C of the VM 111. At 3d, the orchestrator 120B converts the virtual disk 121N into a LUN 123D with boot data 125D of the VM 112. As part of the conversion, the orchestrator 120 disregards metadata of the virtual disks 119A, 119N, 121A, and 121N. In some embodiments, orchestrators can be designed to strip off or delete VM metadata after conversion. The disregarded or stripped off metadata was used in the virtual environment X. To launch virtual machines in a foreign virtualization environment, the virtual disks would be translated or imported because the virtual disks cannot be natively booted in the foreign virtualization environment. However, importing and translating are expensive and inefficient operations. The conversion of virtual disks avoids the cost of translating between different virtual file formats at the storage layer and avoids migrating virtual machines at the guest operating system layer. To convert a virtual disk, sub-file cloning can be used to convert a virtual disk into a LUN.

Figure 2:
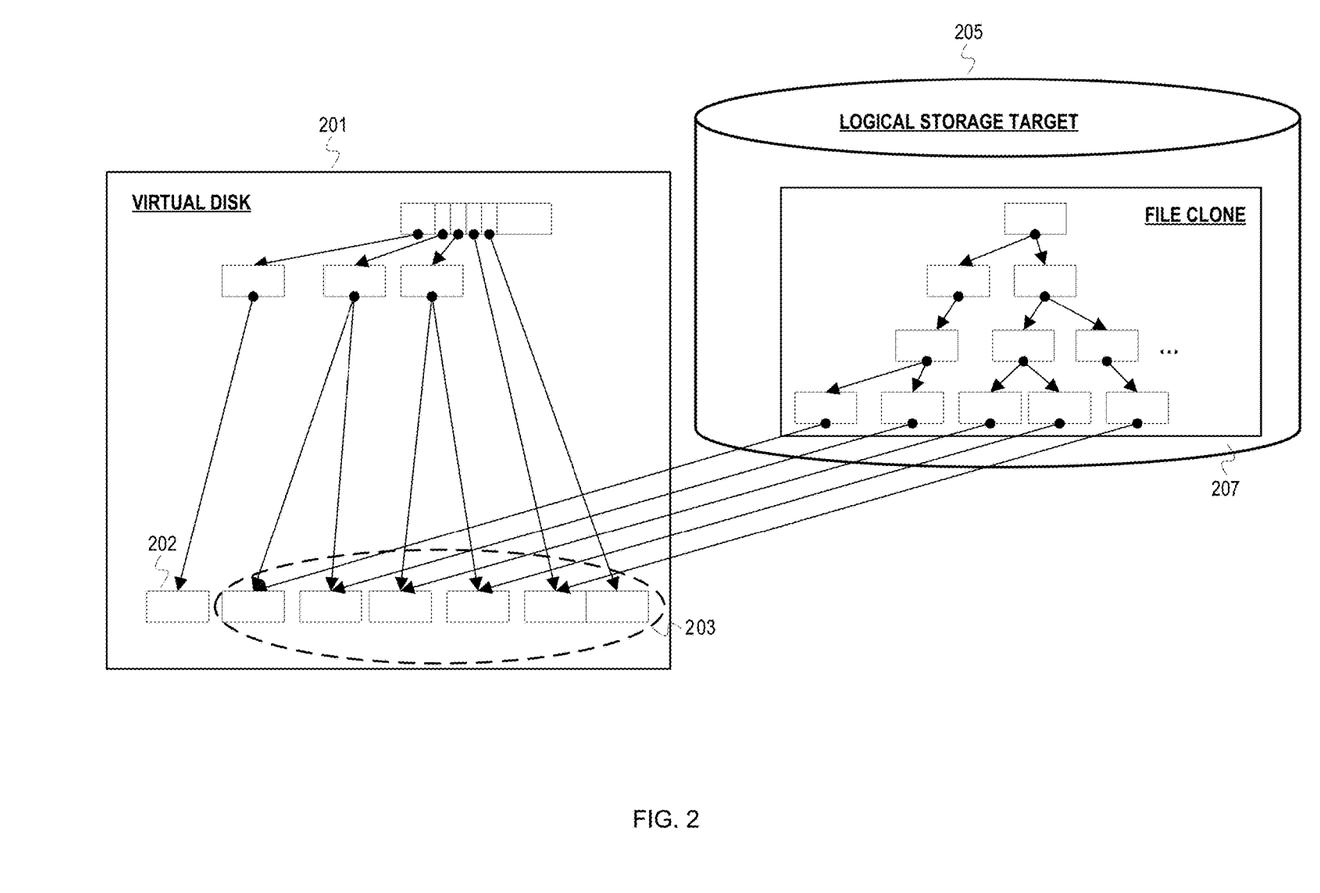
FIG. 2 depicts a conceptual example of sub-file cloning to convert a virtual disk into a logical storage target.

FIG. 2 depicts a conceptual example of sub-file cloning to convert a virtual disk into a storage representation that is a logical target for storage input/output operations. A virtual disk 201 includes file system metadata (e.g., link counts, parent inode numbers, etc.) and file data in data blocks 203. The indirect blocks and direct blocks reference the data blocks 203. For this illustration, the file data at the data blocks 203 include boot data and virtual machine metadata from a source VM environment. A logical storage target 205 is created based on the virtual disk 201. Orchestrator program code can include converting program code that executes a scripted command(s) to clone the virtual disk 201 as a file clone 207 in the logical storage target 205 at a specified path. As depicted, the cloning process determines the data blocks or ranges of the data blocks 203 (e.g., block addresses) and updates the structural metadata of the file clone 207 to reference the data blocks 203 and updates a block map for the logical storage target 205 to encompass the data blocks 203. The logical storage target 205 can be specified with a logical storage target name derived from the filename of the virtual disk 201. To avoid incompatibility with the destination VM environment or foreign VM environment, the orchestrators disregard data blocks with VM metadata and do not reference those data blocks. FIG. 2 presumes that the VM metadata are in a data block 202. The converting program code can use offsets and known sizes that identify the boundaries of VM metadata within a virtual disk. If information about the layout of the virtual disk is available (e.g., descriptor file), then the program code can read the information to determine the extent(s) or range(s) of data blocks with file data or payload data. The offsets can be indicated in VM descriptors or specifications accessible to the converting program code or specified in the converting program code. As a result of the cloning, the virtual disk 201 shares data and/or data locations (e.g., data blocks or data ranges) with the logical storage target 205. Thus, updates to the shared data blocks 203 via the logical storage target 205 implicitly carryover to the virtual disk 201.

Returning to FIG. 1, the orchestrator 120 invokes calls to a function(s) defined by an API of the cloud service provider of the cloud site 113 to instantiate virtual machines 127A-127D in the virtual environment Y and chain load the converted boot data 125A-125D over the respective stages of stages 4a-4d. The orchestrator 120 can instantiate the virtual machines 127A-127D with the cloud service provider API call(s) based on a minimally configured virtual machine template 126. FIG. 1 depicts each of the instantiated virtual machines 127A-127D with a guest operating system but no application residing above the guest operating system. This indicates the minimal configuration of the virtual machine template 126 since the boot data that will be chain loaded will generate the virtual stack as existed in the primary site 101. The orchestrator 120 invokes an API call to a function to chain load a boot loader of the boot data 125A into the virtual machine 127A at 4a; and invokes the API call to the function to chain load a boot loader of the boot data 125B into the virtual machine 127B at 4b. For the logical container 117, the orchestrator 120 invokes an API call to a function to chain load a boot loader of the boot data 125C into the virtual machine 127C at 4c; and invokes an API call to a function to chain load a boot loader of the boot data 125D into the virtual machine 127D at 4d.

As a result of the chain loaded boot data 125A-125D, virtual stacks 129A-129D instantiate in the cloud site 113. The virtual stacks 129A-129D correspond to the virtual stacks 109-112 that were running in the virtual environment X in the primary site 101. With the chain loading of boot data 125A, the virtual machine 127A becomes the virtual stack 129A at 5a. Chain loading the boot data 125B causes the virtual machine 127B to become the virtual stack 129B at 5b. Chain loading the boot data 125C causes the virtual machine 127C to become the virtual stack 129C at 5c. Chain loading the boot data 125D causes the virtual machine 127D to become the virtual stack 129D at 5d. The virtual stacks can include various servers, databases, etc.

FIG. 1 provided an example illustration of storage layer based cloud DR, but the technique of manipulating virtual machine data at a storage layer and orchestrating operations to launch a virtualized system in a foreign virtualization environment based on the VM data at the storage layer is not limited to DR failover. This technique can be used to test cloud DR or run drills for cloud DR. In the case of drills or testing, the replication relationships would be preserved and clones would be used in the testing/drilling. Furthermore, the disclosed technique can be used to port or migrate a virtualized system into a foreign environment, for example from on-premise devices to public cloud, without a DR motivation. In addition, the example illustration of FIG. 1 presumes a cloud solution with public cloud resources being used for both data storage and compute resources. However, this approach can use a hybrid of private cloud and public cloud. VM data can be replicated to storage endpoints in a private cloud and transition to public cloud when failover occurs, testing is done, etc.

FIG. 1 and the subsequent Figures refer to a "cloud DR orchestrator" and a "virtualization portability orchestrator", or orchestrator. The orchestrator is a running instance of program code that can be embodied in a tool or application that operates at both the management layer and the storage layer. The orchestrator can interface with storage operating systems or storage applications of the storage layer to create or facilitate creation of replication relationships at the storage layer. For instance, an orchestrator can invoke API calls defined for a storage operating system and/or a storage management application to facilitate creation of replication relationships between logical storage containers supporting VMs and to break replication relationships. The orchestrator can then spawn threads/processes to convert virtual disks into storage representations that can be mounted in the destination environment. Each of the threads/processes can be based on a script/executable that includes commands/instructions according to a task automation and configuration management tool/framework (e.g., PowerShell) to convert virtual disks in logical storage containers into logical units of storage representations. Orchestrator program code can also include calls to API functions defined by a cloud service provider to instantiate virtual machines in the destination environment and then trigger the chain loading of converted boot disks that leads to a virtualized system spinning up in the destination environment. The particular moniker "orchestrator" should have no impact on any claim interpretation, and it should be realized that the specific modularization and architecture of program code is implementation dependent and varies by platform, developer, etc.

Figure 3:
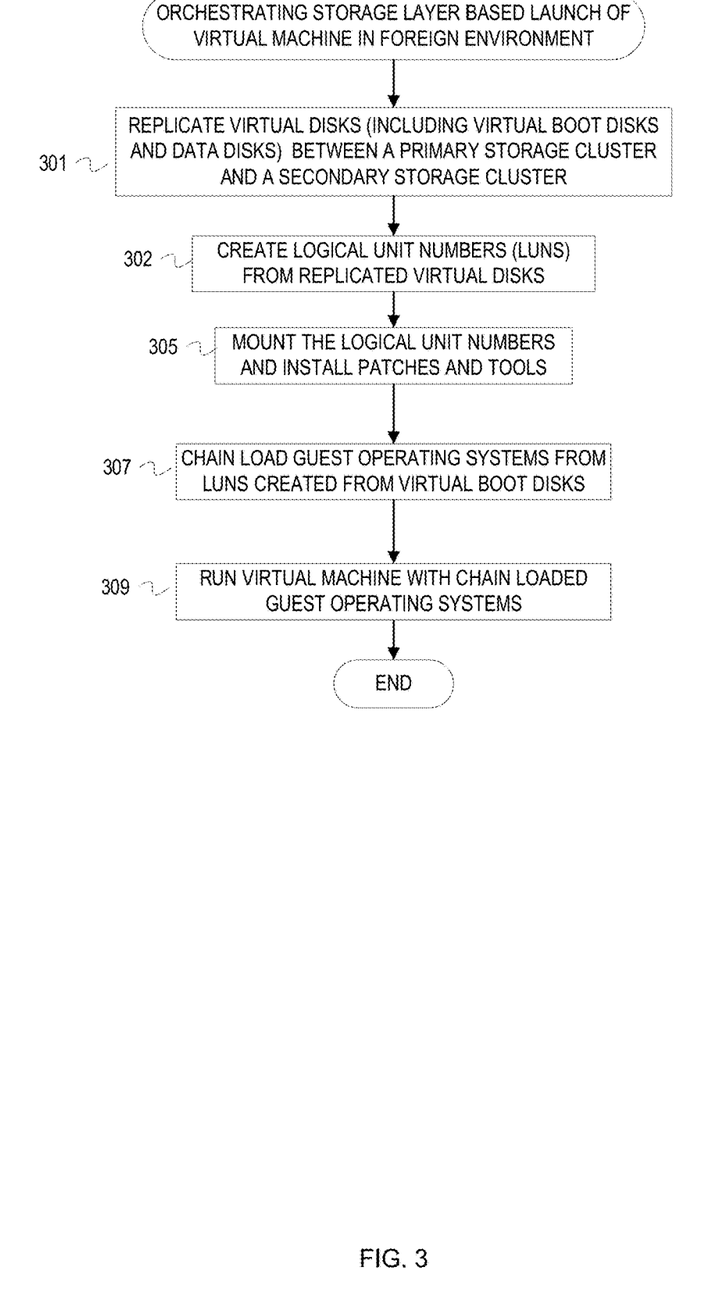
FIG. 3 is a flowchart of example operations for orchestrating operations for storage layer based launch of virtual machines in a foreign environment.

FIG. 3 is a flowchart of example operations for orchestrating storage layer based launch of virtual machines in a foreign environment. At block 301, virtual disks are replicated from a primary storage cluster to a secondary storage cluster. The primary storage cluster can include on-premise devices and/or private cloud devices. The secondary storage cluster can include private cloud resources and/or public cloud resources. The replication can be based on an administrator command and/or on previously established replication relationships with data management software that replicates the virtual disks efficiently (e.g., using compression, deduplication, etc.). At block 302, the LUNs are created from the virtual disks that have been replicated into the secondary storage cluster. In the secondary storage cluster, the LUNs are created from the replicated virtual disks without metadata of the virtual disks. The metadata of the virtual disks are metadata specific to a virtualization environment associated with the primary storage cluster. A LUN is created from a virtual disk, by a storage operating system for example, by combining data sections of the virtual disk into a contiguous file using file sub-cloning. The LUN is then mapped to an initiator group (group of small computer system interface (SCSI)/internet SCSI initiators) that will access the LUN to make the LUN visible as a SCSI/iSCSI target. At block 305, the LUNs are mounted. Patch scripts for patching drivers are installed on the LUNs. In addition, virtualized environment tools are installed. At block 307, guest operating systems are chain loaded from the mounted LUNs created from virtual boot disks. A guest operating system executes the installed patch scripts to install drivers and/or tools. If the source VM has multiple virtual disks, the patch script mounts the data disks on a proper mount point. At block 309, the virtual machines can run or be launched.

Figure 4:
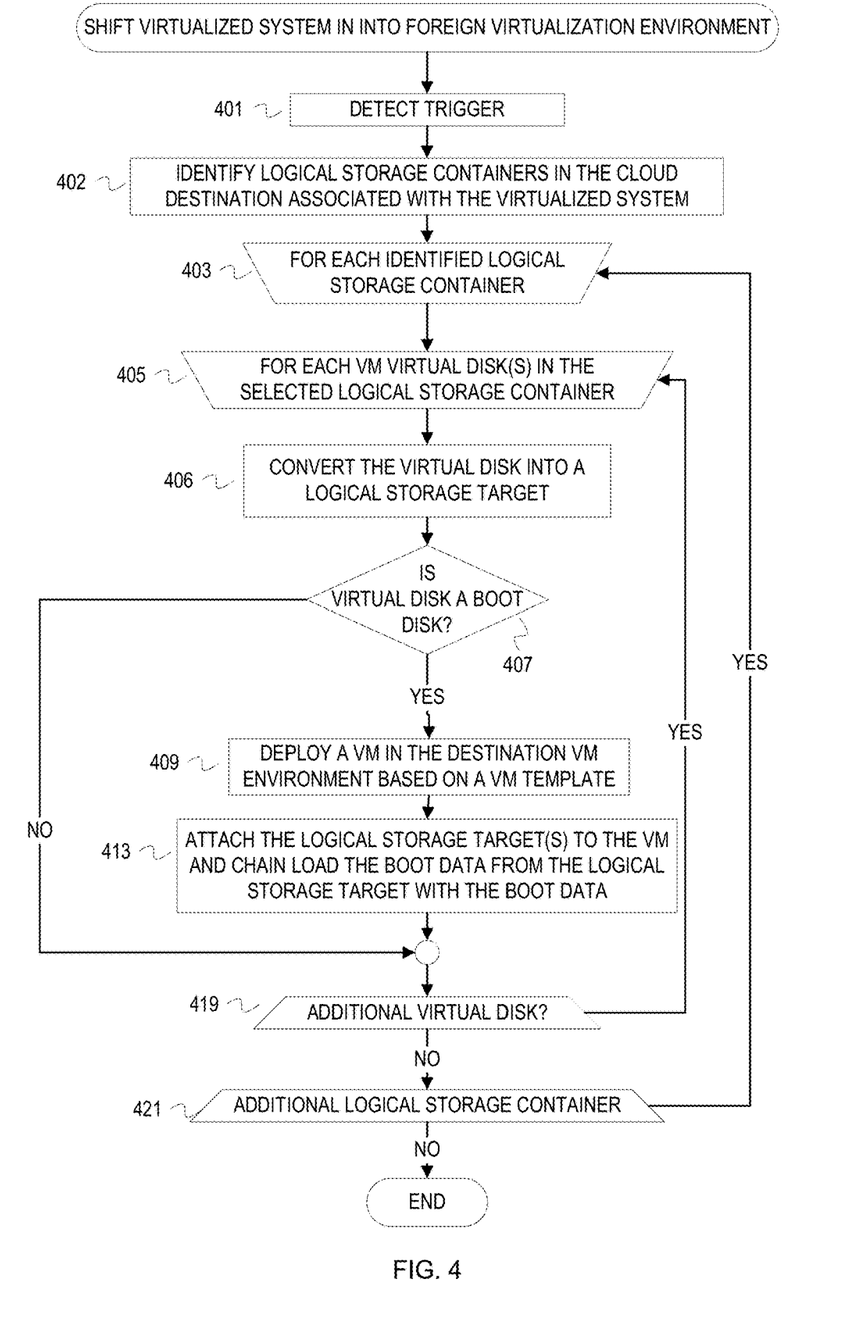
FIG. 4 is a flowchart of example operations for orchestrating launch of a virtualized system with VM data replicated at a storage layer from a source VM environment to a cloud destination VM environment and manipulated at the storage layer in the cloud destination.

FIG. 4 is a flowchart of example operations for orchestrating launch of a virtualized system with VM data replicated at a storage layer from a source VM environment to a cloud destination VM environment and manipulated at the storage layer in the cloud destination VM environment. As already indicated, the flowcharts refer to an orchestrator as performing the operations. The example operations of FIG. 4 iterate over replicated logical storage containers of a virtualized system and the virtual disks within the replicated logical storage containers, and then launch corresponding virtual machines in a destination VM environment. FIG. 4 presents this iterative version of operations to aid in understanding. Depending on available compute resources, an orchestrator could be designed to concurrently process logical storage containers of a virtualized system or groups of logical storage containers. In some embodiments, the orchestrator can read a configuration file for a virtualized system that prioritizes particular logical storage containers for processing. In some embodiments, metadata of the logical storage containers or a file within the logical storage containers can indicate priority for processing. The orchestrator could initially read priority information and prioritize boot disk conversion and launching by chain loading accordingly.

At block 401, an orchestrator detects a trigger. A trigger can be detection of a failure at a primary site, request to test a failover plan, moving a virtualized system into a different virtualization environment, etc. A management layer component will likely detect the trigger and communication the detection to the orchestrator, unless the orchestrator includes the management layer component. The component can detect a failure in a peered cluster from monitoring agents, receive administrator commands to move a virtualized system, etc.

At block 402, the orchestrator identifies logical storage containers in the cloud destination. The identified logical storage containers are associated with the virtualized system to be launched in the cloud destination. The orchestrator can read a configuration file or communicated data to identify the logical storage containers associated with the virtualized system. The orchestrator may be programmed or configured to treat all logical storage containers of an account or within an encompassing storage container as supporting VMs depending on hierarchical organization of data in the cloud environment.

At block 403, the orchestrator begins processing each of the identified logical storage containers. The orchestrator converts the virtual disks of source virtual machines and converts them at the storage layer to launch corresponding virtual machines in the VM environment of the cloud destination. The description refers to a logical storage container being processed as the "selected" logical storage container.

At block 405, the orchestrator begins processing each of the virtual disks in the selected logical storage container for conversion. The orchestrator processes the virtual disks based on virtual disk type. Based on metadata, the orchestrator identifies virtual disks that are boot disks and processes boot disks before data disks. Each VM will be identified because of the boot disk loading a VM identifier. The orchestrator can read file system metadata of the selected logical storage container to determine locations of individual virtual disks. The orchestrator can distinguish between virtual disks and other files by file extensions and/or file names. The description refers to a virtual disk being processed as the "selected" virtual disk.

At block 406, the orchestrator converts the virtual disk into a logical storage target. As previously stated, the logical storage target is a widely-adopted representation of storage that can be accessed, perhaps after a mounting operation that exposes an access path into the storage representation. This access path can be considered a target for input/output (I/O) operations. Thus, the conversion of the virtual disk continues the residence of the underlying data at the storage layer. The orchestrator can use cloning techniques to convert the virtual disk into the logical storage target.

At block 407, the orchestrator determines whether the selected virtual disk is a boot disk. The orchestrator can read metadata to determine whether a virtual disk is a boot disk or data disk, although a virtual disk indicated as a boot disk can also include other data besides boot data. This determination can also be performed once for each VM set of virtual disks. For instance, the orchestrator can set a flag for a virtual disk set that indicates whether the boot disk has been processed yet. After the boot disk has been processed, the orchestrator can evaluate the flag to determine a path of program code. In some cases, the orchestrator can read header information of the virtual disk to determine whether the selected virtual disk is a boot disk, e.g., a flag or value is set to indicate boot disk. If the virtual disk is not a boot disk, then the orchestrator moves on to the next virtual disk of the selected logical storage container at block 419. If the selected virtual disk is a boot disk, then flow continues at block 409.

At block 409, the orchestrator deploys a VM in the destination VM environment based on a VM template or pre-configured/prepopulated cloud compute instance. Prior to this deployment, VMs do not need to be powered on (i.e., not consuming compute resources). This avoids incurring the costs of maintaining powered on VMs until wanted or needed. The VM template has been previously configured/defined with minimal configuration information. For instance, the VM template has been configured with a minimum amount of virtual resources and a guest operating system. The orchestrator can execute application programming interface (API) calls to an API defined by the cloud service provider to deploy the VM. The VM template can be specified by virtualized system, for example by customer or primary site name. Embodiments may also use different VM templates to accommodate different VMs (e.g., VMs configured in the source environment for different purposes, such as backend versus frontend capabilities). Whether VM templates or prepopulated cloud computed instances are used, these can include variations to support different VM configurations—different system memory configurations, central processor configurations, network interface card configurations, bandwidth configurations, etc. The orchestrator can select an appropriate cloud compute instance or VM template based on configuration information of the source VM.

At block 413, the orchestrator attaches the logical storage target(s) converted from virtual disk(s) to the deployed VM and chain loads the boot logical storage target into the VM. The deployed VM includes a boot loader programmed to boot the logical storage target. The orchestrator can make API calls defined by a cloud service provider to attach logical storage targets to a VM. The orchestrator mounts the logical storage target converted from the virtual boot disk and then executes a script of commands in a task automation and configuration management framework to chain load the boot data into the deployed VM. This launches a virtual machine defined by the boot data from the storage layer into the foreign VM environment.

At block 415, the orchestrator determines whether there is an additional virtual disk in the selected logical storage container. If there is another virtual disk in the logical storage container, then the orchestrator selects the next virtual disk at block 405. If there is not another virtual disk in the selected logical storage container, then control flows to block 421.

At block 421, the orchestrator determines whether there is an additional logical storage container identified as being associated with the virtualized system being launched. If so, then the orchestrator selects the next logical storage container at block 403. Otherwise, the process ends. Embodiments may employ an orchestrator per logical storage container, thus operations to iterate over the logical storage containers may not be performed. In addition, embodiments may convert the virtual boot disk and virtual data disks for a VM before chain loading the virtual boot disk.

Although the bulk of operations remains consistent across different usage scenarios, there are some variations between launching a virtualized system from the storage layer in a foreign virtualization environment for different reasons. For example, failover will postpone or stop the replication relationships between sites. In contrast, a failover test copies the destination logical storage containers for testing failover while the replication relationships between sites remain intact. As another example, launching a virtualized system in a foreign virtualization environment from a storage layer outside of the disaster recovery scenario can begin with an initial copy instead of maintaining snapshots.

Figure 5:
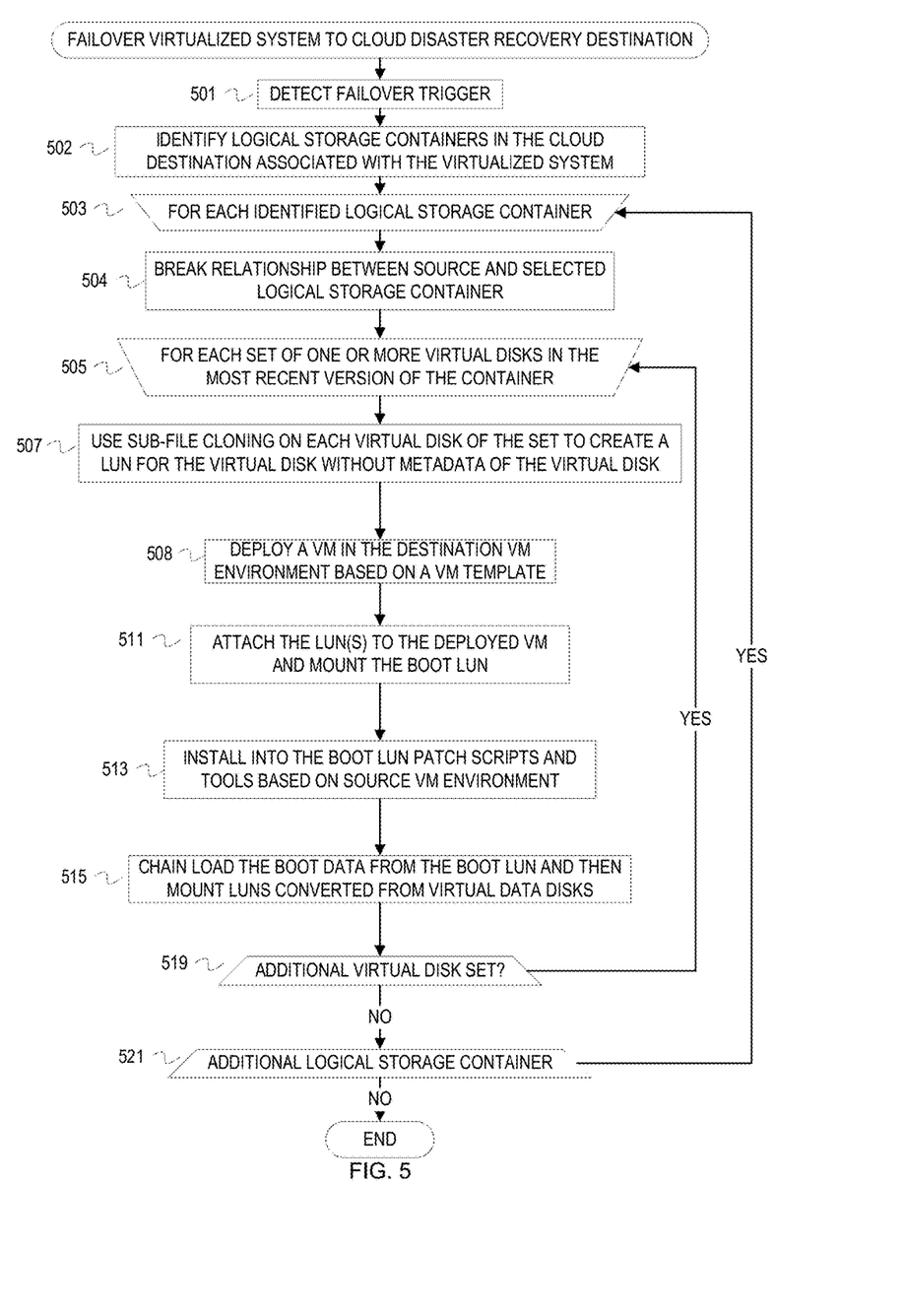
FIG. 5 is a flowchart of example operations for failing over a virtualized system to a foreign environment of a cloud site.

FIG. 5 is a flowchart of example operations for failing over a virtualized system to a foreign virtualization environment of a cloud site. The example operations of FIG. 5 are generally similar to those depicted in FIG. 4, but include a few additional operations relative to a failover.

At block 501, an orchestrator detects a failover trigger. The orchestrator can be notified by storage layer agents (e.g., storage operating system processes or replication agents) that a source site (e.g., cluster) has failed. Regardless of how the event triggering the failover is detected, detection of the trigger is communicated to a management layer that includes the orchestrator. The "management layer" refers to the programs/processes that monitor and maintain state of nodes (management nodes and/or storage nodes) of a source site.

At block 502, the orchestrator identifies logical storage containers in the cloud DR destination associated with the virtualized system undergoing failover. The orchestrator can read a configuration file or communicated data to identify the logical storage containers associated with the virtualized system. The orchestrator may be programmed or configured to treat all logical storage containers of an account or within an encompassing storage container as associated with the virtualized system undergoing failover depending on hierarchical organization of data in the cloud environment and/or prioritization of containers.

At block 503, the orchestrator begins processing each of the identified logical storage containers. Processing the identified logical storage containers involves revising the replication relationships and processing virtual disks within the logical storage containers. The description refers to a logical storage container being processed as the "selected" logical storage container.

At block 504, the orchestrator "breaks" the relationship between a source logical storage container and the selected logical storage container. The failover will launch the virtualized system based on replicated logical storage containers corresponding to the point in time of the detected failover trigger. Since the selected logical storage container was in a maintained replication relationship, updates made at the source were being periodically communicated. To avoid polluting state, write access to the selected logical storage container was limited to the agent writing the updates. "Breaking" the replication relationship updates a replication configuration to allow the orchestrator to access the selected logical storage container without additional updates.

At block 505, the orchestrator begins processing each of the virtual disks in a most recent version of the selected logical storage container for conversion. Since point-in-time copies of the source logical storage container were being maintained in the cloud DR destination, the orchestrator selects the most recent copy. The orchestrator can read file system metadata of the most recent version of the selected logical storage container to determine locations of individual virtual disks. The orchestrator can individually or concurrently process sets of virtual disks, with each set of one or more virtual disks corresponding to a VM being launched into the foreign virtualization environment. The description refers to a virtual disk set being processed as the "selected" virtual disk set.

At block 507, the orchestrator uses sub-file cloning on each virtual disk of the selected virtual disk set to convert each virtual disk into a LUN with the boot data. The orchestrator creates the LUN without virtual disk metadata that can be incompatible in the foreign VM environment. The orchestrator creates the LUN with a sequence of commands to create a LUN based on size and layout of the virtual disk. The orchestrator can then determine the range(s) of block addresses or extent(s) ("data ranges") of the virtual disk that do not correspond to virtual disk metadata. The orchestrator then issues a command(s) to clone the identified data ranges to the created LUN. The cloning command copies pointers to the identified data ranges of the virtual disk to the LUN structure (e.g., buffer tree) to reference the identified data ranges. When creating the LUNs, the orchestrator can generate information that hierarchically relates the LUNs as the virtual disks were related to implicitly identify the "boot disk LUN" from the "data disk LUNs." With sub-file cloning, the conversion time is constant (i.e., the failover time is the same regardless of the size of the virtual disks).

At block 508, the orchestrator deploys a VM in the destination VM environment based on a VM template. The VM template has been previously configured/defined with minimal configuration information. For instance, the VM template has been configured with a minimum about of virtual resources and a guest operating system. The orchestrator can execute API calls to an API defined by the cloud service provider to deploy the VM. The VM template can be specified by virtualized system, for example by customer or primary site name. Embodiments may also use different VM templates to accommodate different VMs (e.g., VMs configured in the source environment for different purposes, such as backend versus frontend capabilities).

At block 511, the orchestrator attaches the LUN(s) to the deployed VM. The orchestrator also calls a function to mount the boot LUN (i.e., the LUN converted from the virtual boot disk). This allows the deployed VM to issue I/O commands, such as small computer system interface (SCSI) commands to the LUN.

At block 513, the orchestrator installs patch scripts that may be used for processing data of converted virtual data disks and installs VM tools that can be used to allow clients to continue accessing the VMs in the foreign virtualization environment.

At block 515, the orchestrator chain loads the boot data into the deployed VM from the mounted LUN. After mounting the LUN, the orchestrator chain loads the boot data in the mounted LUN into the deployed VM to replace the executing code of the deployed VM with the boot data. This launches a virtual machine defined by the boot data from the storage layer into the foreign VM environment. After chain loading the boot LUN, the orchestrator applies the installed patch script(s) and mounts the LUN(s) converted from the virtual data disks.

At block 519, the orchestrator determines whether there is an additional virtual disk set for a failover VM in the selected logical storage container. If there is another virtual disk in the logical storage container, then the orchestrator selects the next virtual disk set at block 405. If there is not another virtual disk set with boot data in the selected logical storage container, then control flows to block 521.

At block 521, the orchestrator determines whether there is an additional logical storage container identified as being associated with the virtualized system undergoing failover. If so, then the orchestrator selects the next logical storage container at block 403. Otherwise, the process ends. With this orchestration, the destination in the public cloud can operate as a fully functional secondary site for disaster recovery for the source environment.

At some point, the virtualized system likely fails back to the source site. The management layer will determine that the source site has recovered and/or become available for hosting the virtualized system. The cloning used for converting virtual disks into logical storage targets for rapid failover also allows rapid failback. Since the logical storage targets refer to the data ranges (blocks or extents) of the logical storage containers in the cloud DR site, changes made to the underlying data during failover can be replicated back to the source site at the storage layer. The orchestrator calls storage application defined functions to reverse the replication relationships between the logical storage containers of the different sites. Thus, the source and destinations are reversed and copies of the logical storage containers in the cloud DR site are created at the source site. Since operating at the storage layer, the orchestrator can failback to the source/primary site by batch (e.g., an entire storage array supporting the logical storage containers) instead of by individual VMs. With the virtual disks back in the source VM environment, VMs can be instantiated from the virtual disks. With the storage layer and sub-file cloning efficiencies, storage layer based cloud DR minimizes downtime and allows recovery of critical data and applications without putting long term stress on business processes. In contrast, disaster recovery solutions that translate or import virtual disks into a destination environment that is a foreign virtualization environment cannot efficiently failback (e.g., batch failback of virtual disks at volume granularity) a virtualized system because the virtual disks have been translated/imported into that foreign virtualization environment.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
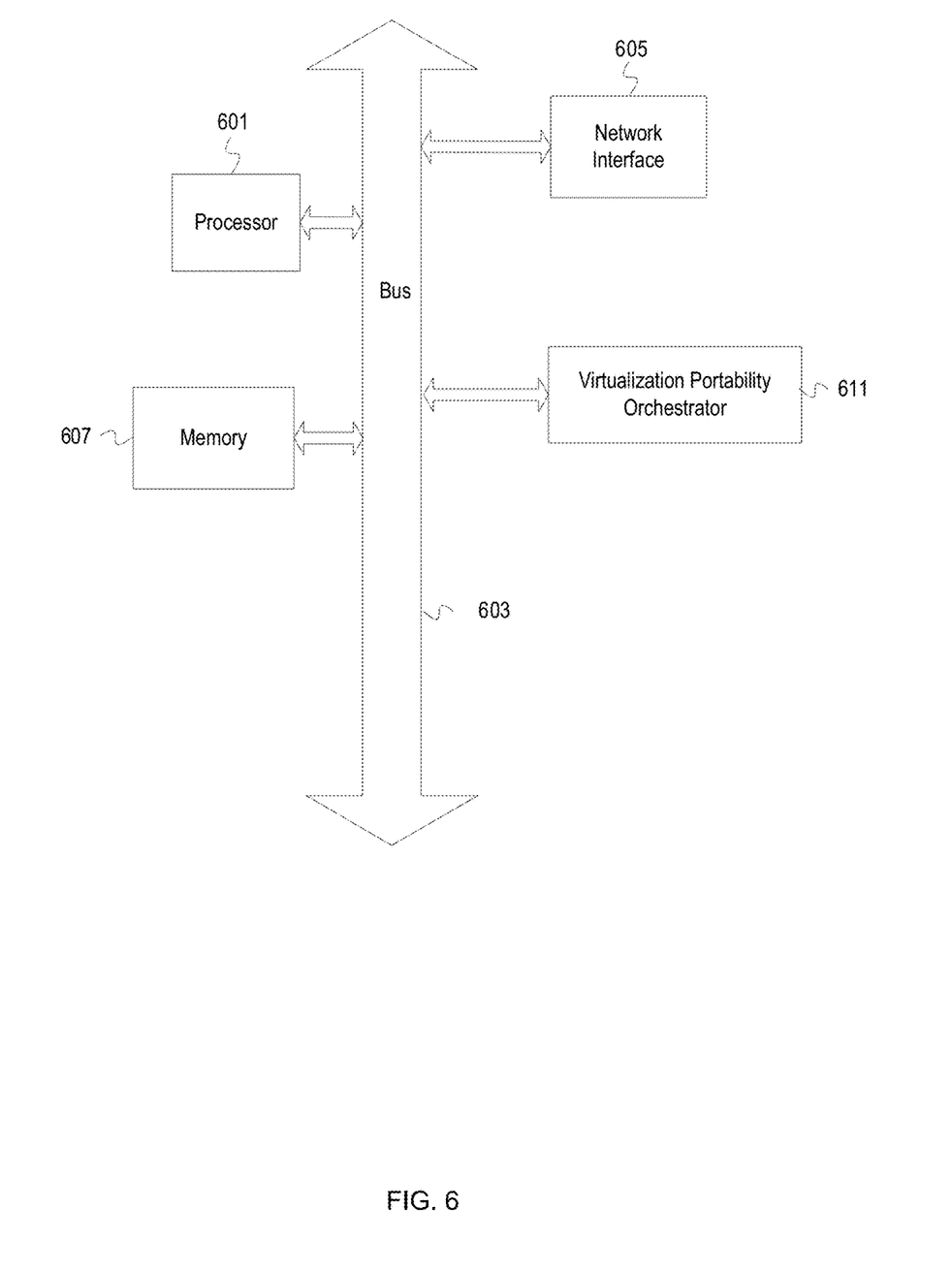
FIG. 6 depicts an example computer system with a storage layer based virtualization portability orchestrator.

FIG. 6 depicts an example computer system with a storage layer based virtualization portability orchestrator. The computer system includes a processor 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes a storage layer based virtualization portability orchestrator 611. The orchestrator 611 orchestrates operations that manipulate data at a storage layer to yield virtual disks that are portable into a foreign virtualization environment. More specifically, the orchestrator 611 coordinates with storage layer software (e.g., replication management software, storage operating system, etc.) to replicate a virtualized system at a storage layer from a source site to a cloud site. Replicating the virtualized system includes replicating the virtual disk files underlying virtual machines of the virtualized system. The data of the files ("file data") include boot data, application data, and other data relating to state of the virtualized system and content (e.g., workload data) of the virtualized system. Since the virtual machine technology of the cloud site may be different than the source site, the orchestrator converts the replicated virtual disk files into a representation of storage that can be accessed in the cloud site by entities of the cloud site regardless of the VM technology of the cloud site. In other words, the orchestrator manipulates the virtual disk data while the virtual disk data still reside at the storage layer. After conversion, the orchestrator 611 chain loads the converted virtual file data into a deployed VM in the cloud site. Although the orchestrator 611 is depicted as a single component of the example system, the orchestrator 611 can comprise multiple software components. The orchestrator 611 can comprise program code that coordinates with the storage layer software to facilitate creation of replication relationships and detection of commands and/or triggers for launching a virtualized system. This program code can be considered a management layer component of the orchestrator 611. The orchestrator 611 can also comprise program code that spawns threads or processes for the converting and chain loading. The orchestrator 611 can spawn a thread/process for each logical storage container that includes virtual disk files to be converted. These threads/processes can identify and select virtual disks for conversion into storage representations and carry out the conversion. The orchestrator 611 can also spawn threads/processes to perform the chain loading for each VM to be launched. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for orchestrating launching of a virtualized system into a foreign virtualization environment from data at the storage layer as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. One or more non-transitory machine-readable media comprising program code for storage layer based orchestrating of a virtualized system launching into a foreign virtualization environment, the program code executable to:

identify a first logical storage container in a cloud environment that has been replicated from a second logical storage container in a source environment;

identify virtual disks in the first logical storage container that include boot data for virtual machines of the source environment;

convert the identified virtual disks into storage container representations;

mount the storage container representations for access by virtual machines deployed in the cloud environment; and chain load the boot data of the storage container representations into corresponding ones of the deployed virtual machines.

2. The non-transitory machine-readable media of claim 1, wherein the program code executable to convert the identified virtual machines into storage container representations comprises program code executable to invoke a set of one or more commands to create a first of the storage representations with structural metadata that references data blocks of a first of the identified virtual disks.

3. The non-transitory machine-readable media of claim 2, wherein the data blocks of the first of the identified virtual disks comprise first boot data of the boot data for a first of the virtual machines.

4. The non-transitory machine-readable media of claim 1 further comprising program code executable to replicate data of the first logical storage container into the source environment to re-launch the virtual machines in the source environment after recovery of the source environment, wherein the data replicated into the source environment comprises state of the virtual machines after running in the cloud environment.

* * * * *